United States Patent
Stagner et al.

(10) Patent No.: US 10,091,953 B1
(45) Date of Patent: Oct. 9, 2018

(54) GARDENING KIT

(71) Applicants: Brian Stagner, Tulare, CA (US); Chris Beall, Tulare, CA (US)

(72) Inventors: Brian Stagner, Tulare, CA (US); Chris Beall, Tulare, CA (US)

(*) Notice: Subject to any disclaimer, the term of this patent is extended or adjusted under 35 U.S.C. 154(b) by 44 days.

(21) Appl. No.: 15/376,741

(22) Filed: Dec. 13, 2016

(51) Int. Cl.
| | |
|---|---|
| *A01G 20/43* | (2018.01) |
| *A01G 1/12* | (2006.01) |
| *A43B 3/00* | (2006.01) |
| *A43C 19/00* | (2006.01) |
| *A01B 1/16* | (2006.01) |

(52) U.S. Cl.
CPC .............. *A01G 20/43* (2018.02); *A01B 1/16* (2013.01); *A01G 1/125* (2013.01); *A43B 3/0036* (2013.01); *A43C 19/00* (2013.01)

(58) Field of Classification Search
CPC .......... A01G 20/43; A01G 1/125; A01B 1/16; A43B 3/0036; A43C 19/00
See application file for complete search history.

(56) References Cited

U.S. PATENT DOCUMENTS

| | | | | |
|---|---|---|---|---|
| 294,715 | A * | 3/1884 | Alinder .................... | B26B 1/04 30/297 |
| 391,738 | A * | 10/1888 | Cross ...................... | A43B 3/163 30/297 |
| 419,624 | A * | 1/1890 | Ballentine ............... | A47L 13/08 15/236.01 |
| 1,113,488 | A * | 10/1914 | Ruch ........................ | A01D 7/10 56/400.1 |
| 1,138,076 | A * | 5/1915 | Brigance .................. | A01B 1/00 172/370 |
| 1,677,635 | A * | 7/1928 | Howe ....................... | A01D 7/10 56/400.09 |
| 1,743,736 | A * | 1/1930 | Sundquist ................ | A01D 7/10 56/400.1 |
| 1,864,264 | A * | 6/1932 | Velkover .................. | A01D 7/10 56/400.1 |
| 2,049,595 | A * | 8/1936 | Swanson .................. | A01D 7/10 56/400.1 |
| 2,136,849 | A * | 11/1938 | Hembree ................. | A01D 7/10 294/50.9 |
| 2,179,942 | A * | 11/1939 | Lyne ....................... | A43B 5/001 36/127 |

(Continued)

FOREIGN PATENT DOCUMENTS

WO 9635322 A1 11/1996

*Primary Examiner* — Jamie Louise McGowan
(74) *Attorney, Agent, or Firm* — Kyle A. Fletcher, Esq.

(57) ABSTRACT

The gardening kit is a collection of tools configured for use in the weeding of agricultural plots such as gardens. Each component contained within the gardening kit is configured for use without requiring the gardener to bend over during weeding. The gardening kit comprises a weeding device and a clipping collector. The weeding device is a bladed device that is worn in the manner of a boot. The weeding device is used in the manner of a hoe to either: 1) cut directly through unwanted growth; 2) agitate the soil in a manner that cuts the existing unwanted growth from their roots; or, 3) remove or otherwise dig out old roots from the soil. Once the clippings and other debris have been accumulated via the weeding device the clipping collector is used to pick up and dispose of the accumulated clippings.

14 Claims, 4 Drawing Sheets

(56) References Cited

U.S. PATENT DOCUMENTS

| | | | | |
|---|---|---|---|---|
| 2,244,917 A * | 6/1941 | Muller | A01B 1/18 | 294/50.9 |
| 2,714,768 A * | 8/1955 | Badler | A01B 1/00 | 36/1 |
| 2,779,262 A * | 1/1957 | Furr | A01G 20/30 | 172/370 |
| 2,802,264 A * | 8/1957 | Smith | A01G 20/30 | 30/297 |
| 2,874,530 A * | 2/1959 | Miller, Sr. | A01D 7/10 | 56/400.1 |
| 3,346,971 A * | 10/1967 | Kiwala | A43C 13/00 | 36/136 |
| 3,990,146 A * | 11/1976 | Asselta | A01B 1/18 | 294/50.9 |
| 4,018,038 A * | 4/1977 | Sipe | A01D 7/10 | 294/50.8 |
| 4,292,794 A * | 10/1981 | Gascon | A01D 7/10 | 294/50.9 |
| 4,378,671 A * | 4/1983 | Gascon | A01D 7/10 | 294/50.9 |
| 4,427,227 A * | 1/1984 | Haskell | B25B 9/00 | 294/50.9 |
| 4,490,911 A | 1/1985 | Schultz | | |
| 4,545,189 A * | 10/1985 | Nelson | A01D 7/10 | 294/105 |
| 4,555,848 A * | 12/1985 | Schultz | F41B 15/00 | 172/370 |
| 4,565,398 A * | 1/1986 | Poulin | A01B 1/20 | 172/375 |
| 4,693,022 A | 9/1987 | Terhune | | |
| 4,730,864 A * | 3/1988 | Sample | A01D 7/10 | 294/105 |
| D296,510 S | 7/1988 | Cohen | | |
| 4,856,599 A * | 8/1989 | Stammen | A01B 1/00 | 172/370 |
| 5,109,617 A * | 5/1992 | Nummy | A43B 5/001 | 36/127 |
| 5,564,267 A * | 10/1996 | Bricker | A01D 7/10 | 294/50.8 |
| 5,788,299 A * | 8/1998 | Wilkinson | A01B 1/022 | 294/51 |
| 5,881,545 A | 3/1999 | Wilson | | |
| 5,901,540 A * | 5/1999 | Vella | A01D 7/10 | 294/50.6 |
| 6,134,869 A * | 10/2000 | Barrett | A01D 7/10 | 294/50.6 |
| 6,151,878 A * | 11/2000 | Kalavitis | A01D 7/10 | 56/400.04 |
| 6,223,456 B1 * | 5/2001 | Hawkins | A01B 1/243 | 172/22 |
| 6,250,697 B1 * | 6/2001 | Clugston | A01B 1/00 | 294/50.9 |
| 6,336,314 B1 * | 1/2002 | Crevier | A01D 7/10 | 294/50.8 |
| 6,367,236 B1 | 4/2002 | Marcone | | |
| 6,439,630 B1 * | 8/2002 | Eatmon | A01B 1/00 | 206/374 |
| 6,502,381 B2 * | 1/2003 | Crites | A01D 7/10 | 56/400.12 |
| 6,619,023 B1 | 9/2003 | Marcone | | |
| 6,694,717 B1 * | 2/2004 | Dedrick | A01D 7/00 | 56/400.04 |
| D616,635 S * | 6/2010 | Coleman | D2/902 | |
| D664,331 S * | 7/2012 | Weis | D2/906 | |
| 8,641,111 B2 * | 2/2014 | Lee | A01B 1/022 | 294/50.9 |
| D752,324 S * | 3/2016 | Griffin | D2/946 | |
| 2012/0306225 A1 * | 12/2012 | Mirzai | A01D 7/10 | 294/104 |

* cited by examiner

GARDENING KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including tools for working soil, more specifically, a kit comprising a plurality of manually operated tools including hand tools.

SUMMARY OF INVENTION

The gardening kit is a collection of tools configured for use in the weeding of agricultural plots such as gardens. Each component contained within the gardening kit is configured for use without requiring the gardener to bend over during weeding. The gardening kit comprises a weeding device and a clipping collector. The weeding device is a bladed device that is worn in the manner of a boot. The weeding device is used in the manner of a hoe to either: 1) cut directly through unwanted growth; 2) agitate the soil in a manner that cuts the existing unwanted growth from their roots; or, 3) remove or otherwise dig out old roots from the soil. Once the clippings and other debris have been accumulated via the weeding device the clipping collector is used to pick up and dispose of the accumulated clippings.

These together with additional objects, features and advantages of the gardening kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the gardening kit in detail, it is to be understood that the gardening kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gardening kit.

It is therefore important that the claims be regarded as including such equivalent construction insofar as they do not depart from the spirit and scope of the gardening kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
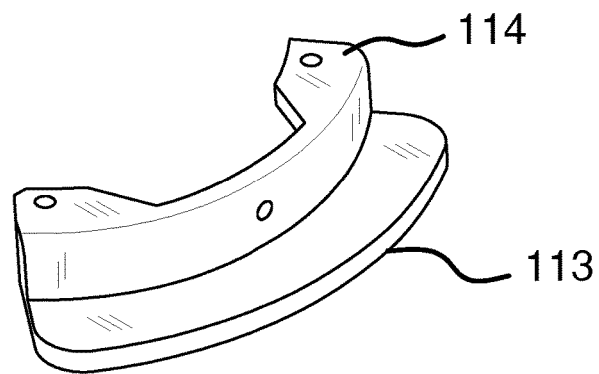
FIG. 1 is a detail view of an element of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The gardening kit 100 (hereinafter kit) is a collection of tools configured for use in the weeding of agricultural plots such as gardens. Each component contained within the kit 100 is configured for use without requiring the gardener to bend over during weeding. The kit 100 comprises a weeding device 101 and a clipping collector 102. The weeding device 101 is a bladed device that is worn in the manner of a boot 111. The weeding device 101 is used in the manner of a hoe to either: 1) cut directly through unwanted growth; 2) agitate the soil in a manner that cuts the existing unwanted growth from their roots; or, 3) remove or otherwise dig out old roots from the soil. Once the clippings and other debris (hereinafter clippings) have been accumulated by the weeding device 101 the clipping collector 102 is used to pick up and dispose of the accumulated clippings. The weeding device 101 and the clipping collector 102 are designed such that both the weeding device 101 and a clipping collector 102 can be used while standing straight.

The weeding device 101 is a tool contained within the kit 100 that is worn on a foot. The weeding device 101 is used in the manner of a hoe to break up unwanted growth into an accumulation of clippings. The weeding device 101 comprises a boot 111 and a blade 112.

Figure 2:
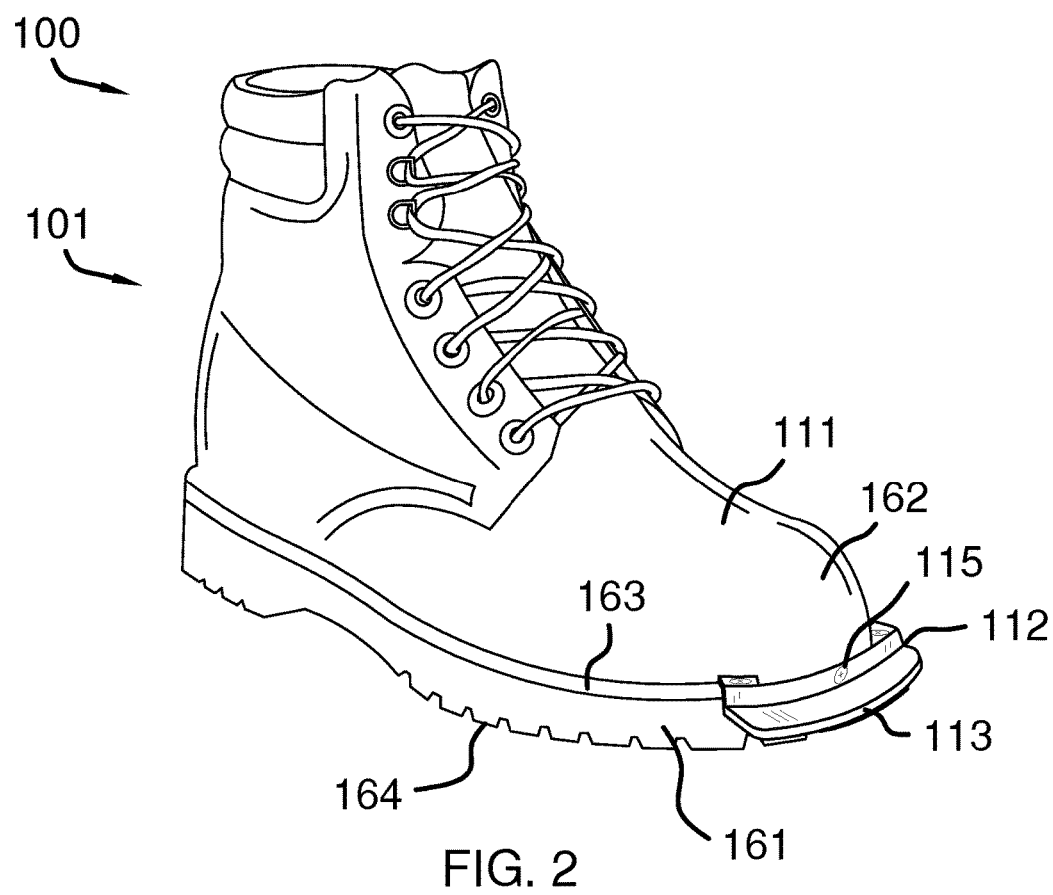
FIG. 2 is a detail view of an element of an embodiment of the disclosure.

The boot 111 is an item of footwear that is worn on the foot while the weeding device 101 is in use. The boot 111 is further defined with a sole 161, a vamp 162, an insole 163, and an outsole 164. As shown in FIGS. 1 and 2, the blade 112 is a cutting edge that is attached to the vamp 162 end of the sole 161 of the boot 111. The blade 112 comprises a digging edge 113, a sole cap 114, and a plurality of screws 115. The digging edge 113 is the cutting edge of the blade 112. The digging edge 113 projects away from the sole 161 of the boot 111. The sole cap 114 is a ridge formed on the blade 112 such that the sole cap 114 will attach to the insole 163 side of the sole 161. As shown most clearly in FIG. 2, each of the plurality of screws 115 are readily and commercially available screws that attach the sole cap 114 of the blade 112 to the sole 161 of the boot 111.

To use the weeding device 101, the weeding device 101 is worn on the foot as a normal boot 111. The user then kicks the boot 111 such that the blade 112 cuts into the soil or growth to generate the clippings.

The clipping collector 102 is a tool contained within the kit 100. The clipping collector 102 is used to collect, transport and dispose of the clippings generated by the weeding device 101. The clipping collector 102 comprises a gathering device 121, a trapping device 122, and an interconnection 123.

The gathering device 121 is the portion of the clipping collector 102 that is used to move the clippings into the trapping device 122. The gathering device 121 comprises a collecting tool 131 and a collecting shaft 132. The collecting tool 131 is a commonly available garden tool that is used to physically move the clippings towards the trapping device 122. The collecting shaft 132 is a cylindrical shaft that is commonly used with tools for the purposes of: 1) physically manipulating the collecting tool 131; and, 2) extending the reach of the collecting tool 131 such that the collecting tool 131 can be used while standing straight.

Figure 3:
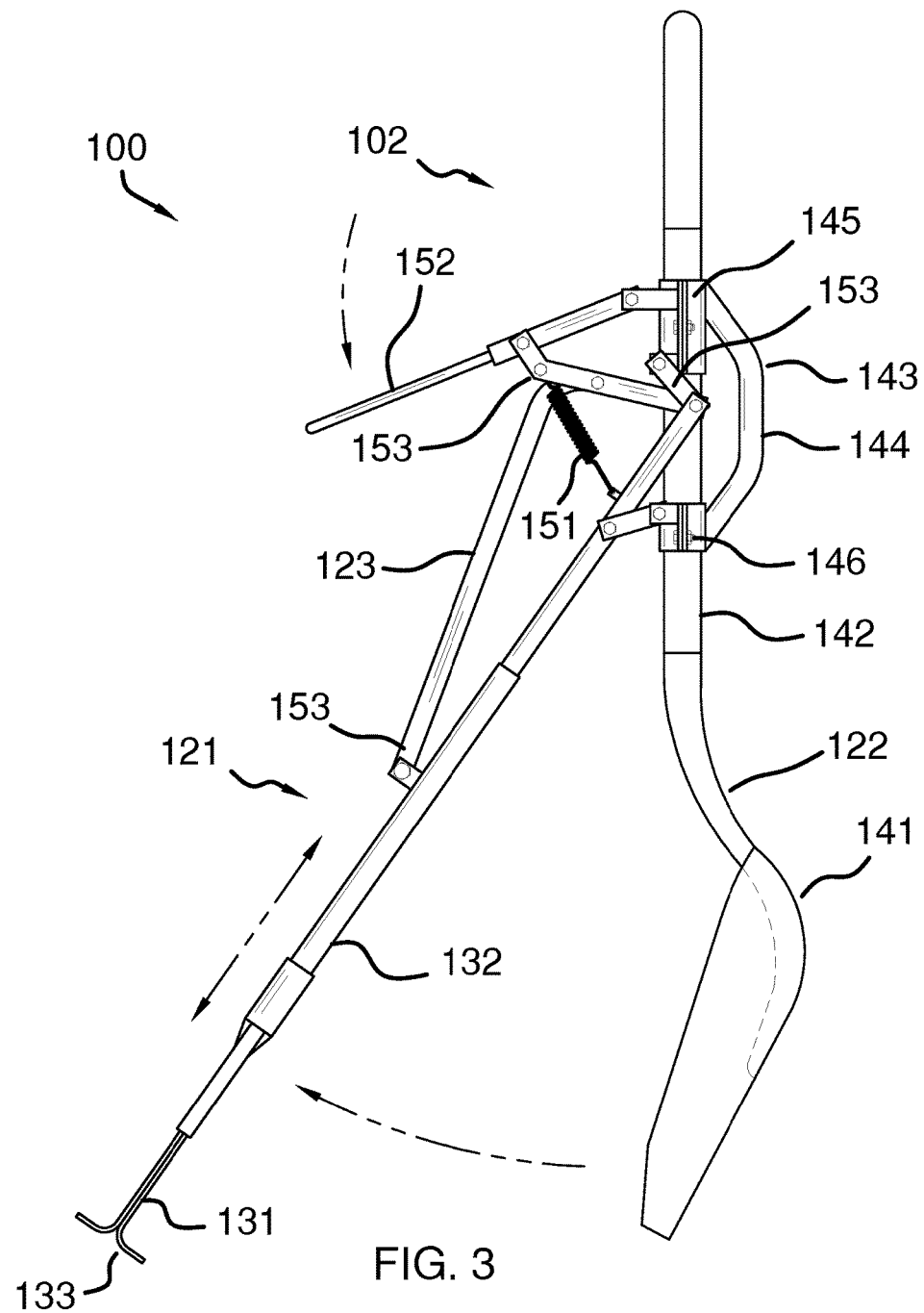
FIG. 3 is an open view of an element of an embodiment of the disclosure.
Figure 4:
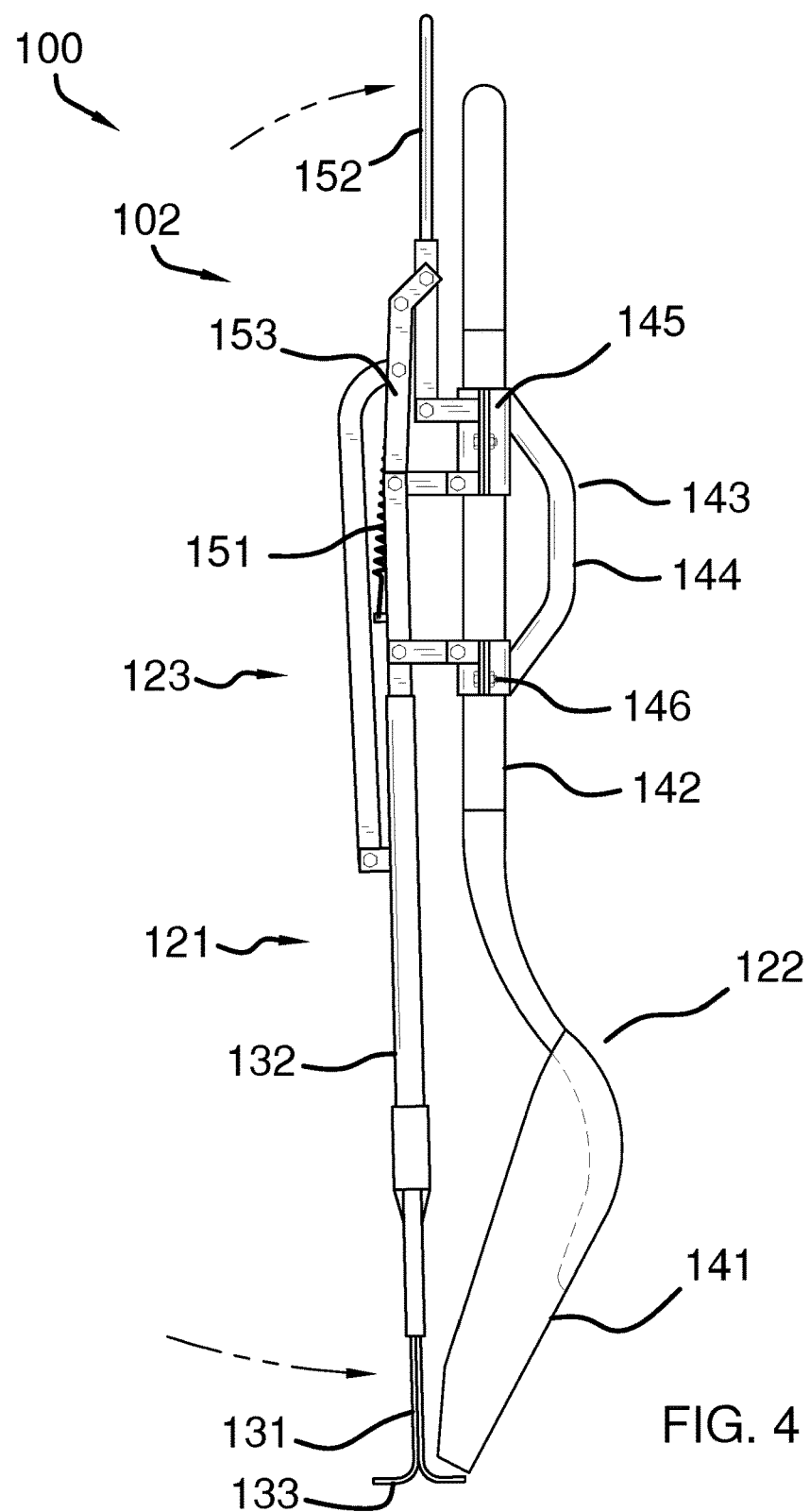
FIG. 4 is a closed view of an element of an embodiment of the disclosure.
Figure 5:
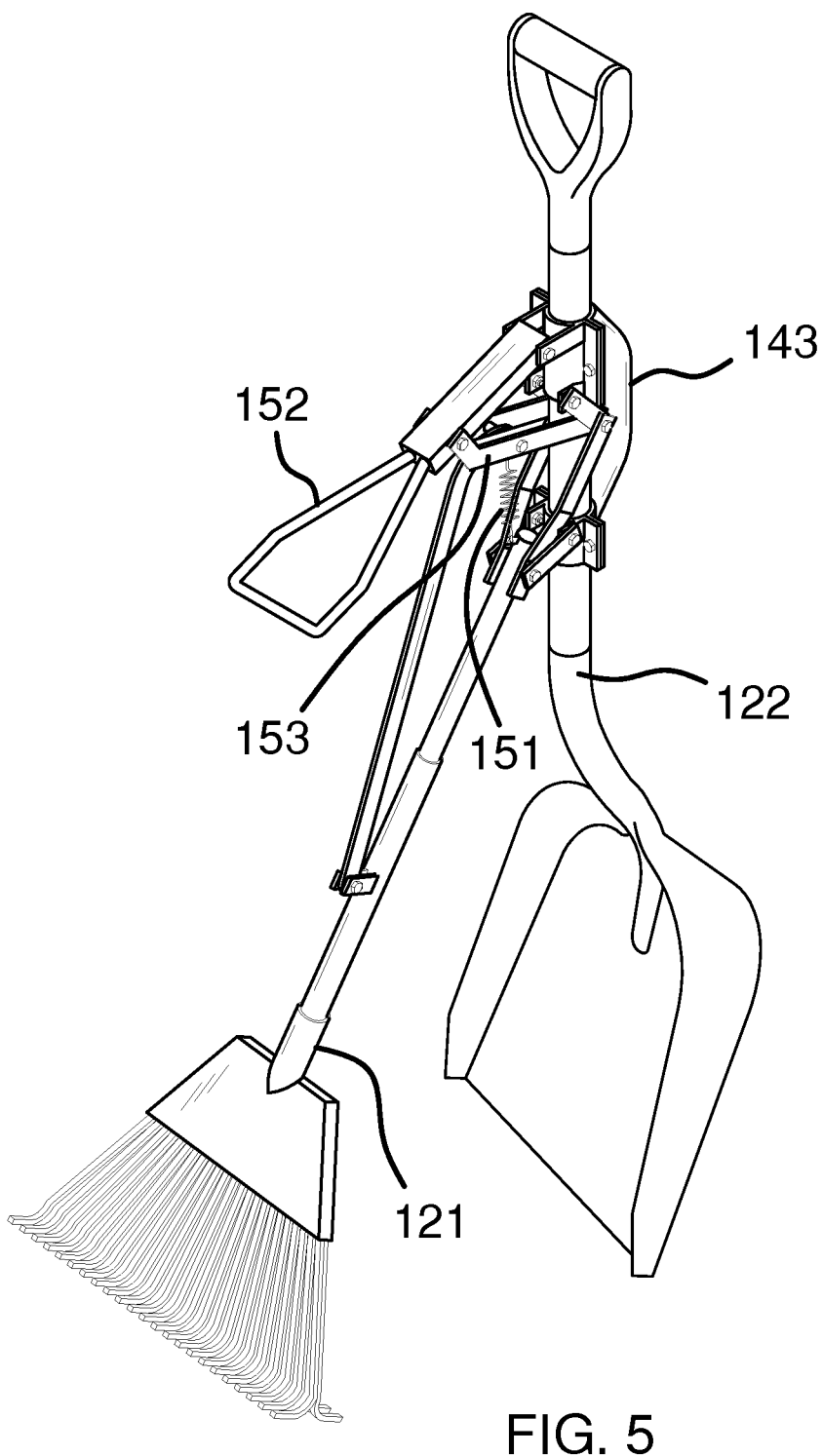
FIG. 5 is an open view of an element of an alternative embodiment of the disclosure.

In the first potential embodiment of the disclosure, as shown in FIGS. 3 and 4, the collecting tool 131 is a rake 133. In the second potential embodiment of the disclosure, as shown in FIG. 5, the collecting tool 131 is a broom 134.

The trapping device 122 is a commonly available garden tool that is used to physically capture the clippings. The trapping device 122 comprises a shovel 141, a shovel shaft 142, and a handle 143. The shovel 141 is a readily and commercially available shovel 141. The shovel shaft 142 is a cylindrical shaft that is commonly used with tools for the purposes of: 1) physically manipulating the shovel 141; and, 2) extending the reach of the shovel 141 such that the shovel 141 can be used while standing straight.

The handle 143 is a device that attaches to the shovel shaft 142 to provide an enhanced ability to manipulate the clipping collector 102. The handle 143 comprises a grip 144, a first clamp 145, and a second clamp 146. The grip 144 is a handhold that is added to the shovel shaft 142. The first clamp 145 is a commercially available hardware item that attaches the grip 144 to the shovel shaft 142. The second clamp 146 is a commercially available hardware item that attaches the grip 144 to the shovel shaft 142.

The interconnection 123 is a spring-loaded device that mechanically assists the collection of the clippings by bringing together and separating the gathering device 121 and the trapping device 122 during the collection of the clippings. The interconnection 123 comprises a spring 151, a lever 152, and a linkage 153. The spring 151 is an energy storage device that is used to provide the energy required for the mechanical assistance provided by the interconnection 123. The spring 151 is a readily and commercially available tension spring. The lever 152 is a shaft that pivots around a fulcrum. The lever 152 is used as a simple tool that provides leverage when adding the energy that will be stored within the spring 151 or releasing the energy that is stored within the spring 151. The linkage 153 comprises a plurality of pivots and shafts that are used to rotate the position of the gathering device 121 relative to the position of the trapping device 122. This rotation is mechanically assisted by the spring 151. Methods to form linkages as described in this paragraph are well known and documented in the mechanical arts. Examples of such technology include, but are not limited to, readily and commercially available vice grips.

As shown most clearly in FIGS. 3, 4, and 5, the interconnection 123 is attached to the collecting shaft 132 and the shovel shaft 142 in multiple locations.

The following definitions were used in the disclosure:

Blade: As used in this disclosure, a blade is a term that is used to describe: 1) a wide and flat portion of a structure; or, 2) the cutting edge of a tool.

Feather: As used in this disclosure, the feather is the junction between the upper and the sole.

Frenulum: As used in this disclosure, the frenulum is the junction between the tongue and the upper where the tongue is connected to the upper.

Heel: As used in this disclosure, the heel is the portion of the sole or the outsole that is underneath the ankle and behind the arch of the foot of the wearer.

Insole: As used in this disclosure, the insole is the component of a shoe sole that is proximal to the wearer's foot.

Outsole: As used in this disclosure, the outsole is the outer component of the sole of the shoe that is in contact with the ground.

Quarter: As used in this disclosure, the quarter is the portion of the upper that is connected to the vamp and that surrounds the heel and the sides of the foot.

Sole: As used in this disclosure, the sole component of a shoe that forms the undersurface of the shoe and comes in contact with the ground.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Tension Spring: As used in this disclosure, a tension spring, also commonly referred to as an extension spring, is a wire coil that resists forces attempting to pull the wire coil in the direction of the center axis of the wire coil. The tension spring will return to its original position when the pulling force is removed.

Tongue: As used in this disclosure, the tongue is the portion a shoe that is attached to the vamp such that the tongue sits underneath the upper and underneath the fastener (such as shoelaces) used to tighten the shoe.

Upper: As used in this disclosure, the upper is the portion of the shoe that is above the sole.

Vamp: As used in this disclosure, the vamp is the portion of the upper that covers the upper portion of the foot from the toes to where the vamp connects to the quarter.

Welt: As used in this disclosure, a welt is a piece of material that reinforces the attachment of the upper to the sole.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gardening kit comprising:
a weeding device and a clipping collector;
wherein the gardening kit is a collection of tools configured for use in the weeding of agricultural plots;
wherein each component contained within the gardening kit is configured for use while standing straight;
wherein the weeding device is a bladed device;
wherein the clipping collector collects the accumulated clippings;
wherein the clipping collector collects, transports and disposes of the clippings generated by the weeding device;
wherein the clipping collector comprises a gathering device, a trapping device, and an interconnection;
wherein the interconnection attaches the gathering device to the trapping device;
wherein the gathering device comprises a collecting tool and a collecting shaft;
wherein the collecting shaft attaches to the collecting tool;
wherein the collecting shaft is a cylindrical shaft;
wherein the collecting shaft is sized such that the collecting shaft extends the reach of the collecting tool such that the collecting tool can be used while standing straight;
wherein the trapping device comprises a shovel, a shovel shaft, and a handle;
wherein the shovel and the handle attach to the shovel shaft;
wherein the shovel shaft is sized such that the shovel shaft extends the reach of the collecting tool such that the collecting tool can be used while standing straight;
wherein the handle comprises a grip, a first clamp, and a second clamp;
wherein the grip is a handhold that is added to the shovel shaft;
wherein the first clamp attaches the grip to the shovel shaft;
wherein the second clamp attaches the grip to the shovel shaft;
wherein the interconnection is a spring loaded device that mechanically assists bringing together and separating the gathering device and the trapping device;
wherein the interconnection comprises a spring, a lever, and a linkage;
wherein the spring is an energy storage device that provides the energy required for the mechanical assistance provided by the interconnection;
wherein the lever is a shaft that provides leverage when adding the energy that will be stored within the spring;
wherein the lever is a shaft that provides leverage when releasing the energy that is stored within the spring;
wherein the linkage comprises a plurality of pivots and shafts that are used to rotate the position of the gathering device relative to the position of the trapping device.

2. The gardening kit according to claim 1
wherein the weeding device is a tool contained within the gardening kit that is worn on a foot;
wherein the weeding device is used to break up plant growth into clippings.

3. The gardening kit according to claim 2
wherein the weeding device comprises a boot and a blade;
wherein the boot is an item of footwear;
wherein the boot is further defined with a sole, a vamp, an insole, and an outsole;
wherein the blade is a cutting edge that is attached to the boot.

4. The gardening kit according to claim 3
wherein the blade comprises a digging edge, a sole cap, and a plurality of screws;
wherein the plurality of screws attach the digging edge and the sole cap to the boot.

5. The gardening kit according to claim 4
wherein the digging edge is the cutting edge of the blade;
wherein the digging edge projects away from the sole of the boot;
wherein the sole cap is a ridge formed on the blade.

6. The gardening kit according to claim 5 wherein each of the plurality of screws attach the sole cap of the blade to the vamp end of the sole of the boot.

7. The gardening kit according to claim 1 wherein the interconnection attaches to the collecting shaft and the shovel shaft.

8. The gardening kit according to claim 7 wherein the spring is a tension spring.

9. The gardening kit according to claim 8
wherein the weeding device is a tool contained within the gardening kit that is worn on a foot;
wherein the weeding device is used to break up plant growth into clippings;
wherein the weeding device comprises a boot and a blade;
wherein the boot is an item of footwear;
wherein the boot is further defined with a sole, a vamp, an insole, and an outsole;
wherein the blade is a cutting edge that is attached to the boot.

10. The gardening kit according to claim 9
wherein the blade comprises a digging edge, a sole cap, and a plurality of screws;
wherein the plurality of screws attach the digging edge and the sole cap to the boot.

11. The gardening kit according to claim 10
wherein the digging edge is the cutting edge of the blade;
wherein the digging edge projects away from the sole of the boot;
wherein the sole cap is a ridge formed on the blade.

12. The gardening kit according to claim 11 wherein each of the plurality of screws attach the sole cap of the blade to the vamp end of the sole of the boot.

13. The gardening kit according to claim 12 wherein the collecting tool is a rake.

14. The gardening kit according to claim 12 wherein the collecting tool is a broom.

* * * * *